UNITED STATES PATENT OFFICE 2,434,168

PENTAERYTHRITOL ROSINATE POLYMERS AND THE METHOD FOR PREPARING SAME

William Krumbhaar, New York, N. Y.

No Drawing. Application April 13, 1945,
Serial No. 588,237

17 Claims. (Cl. 260—104)

This invention relates to resinous polyhydric polymers, and more particularly to such product produced from rosin acids with pentaerythritol or pentaerythritol-poly ether alcohols, usually called polypentaerythritols, and to methods for preparing such products and to compositions and methods for utilizing them.

Glycol and glycerol alcoholysis of rosin esters yields liquid to plastic type substances which, on further heating, do not polymerize or condense into hard and quick bodying resins. Higher molecular alcohols, such as mannitol or sorbitol, treated under the same conditions, yield brown to black colored products, which do not possess the desired hardness, viscosity, or quick bodying.

It has heretofore been known that by complete esterification of rosin acids with pentaerythritol or polypentaerythritols, valuable pentaerythritol resins have been produced. However, such resins have not been entirely satisfactory because, for many uses, their melting point and viscosity in solution have been too low; their speed of co-polymerization with vegetable oils has been too slow; and the film characteristics of surface coating products, made from such resins and drying oils, have been insufficient.

Attempts have been made to overcome the aforementioned shortcomings of pentaerythritol resins by introducing into the resin molecule, hardening substances such as maleic anhydride, fumaric acid, or phenolic condensates. Such methods, however, impair just the very characteristics of the pentaerythritol resins, for which they are especially appreciated, i. e., for instance, their color retention and general stability under heat and light, and their inertness with pigments and driers.

Among the objects of the present invention is the production of petaerythritol resins which do not possess the disadvantages of the prior art products as set forth above.

Other objects include the production of novel products of the character set forth.

Still further objects include methods for producing such products.

Still further objects include the utilization of such novel pentaerythritol resins.

Other and further objects of this invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, a rosin acid or mixed rosin acids are esterified and alcoholized by pentaerythritol alcohols and the products of this alcoholysis are then resinified. The process is based on the discovery that the hydroxyl esters obtained by the alcoholization are able, under heat and vacuum, to polymerize and condense into clear, light colored and oil-soluble resinous substances of special technical value. This peculiar property is characteristic of the pentaerythritols only and is not found in the hydroxyl esters of the glycols, glycerols, or higher molecular polybasic alcohols.

The present invention is thus based on the new and unexpected discovery that such hydroxy esters will react with each other by condensation and/or polymerization to form valuable resinous products. For this purpose substances should not be present which interfere wtih that reaction. The presence of acids which esterify the hydroxyl groups and thus prevent the condensation and/or polymerization referred to, should accordingly be avoided to the extent that they would prevent or interfere with the desired reaction.

Under the term pentaerythritols as used here, there is included the pentaerythritol or the pentaerythritol-poly ether alcohols which may be characterized by the term a pentaerythritol group polyhydric alcohol. The pentaerythritols which are particularly to be mentioned as useful in this connection are pentaerythritol, dipentaerythritol, and tripentaerythritol, reference to which will be used to exemplify the pentaerythritol group polyhydric alcohols. It is the group of pentaerythritol alcohols only, that, on heating of their hydroxy esters, yield a new type of resin, improved in melting point, viscosity in solution, speed of co-polymeriztaion with oils, and drying characteristics of such oil combinations.

As pointed out, the process of this invention comprises the alcoholysis of pentaerythritol esters of rosin acids by means of the same type of alcohols, followed by a resinification of the products of alcoholysis. The hydroxy esters obtained by alcoholysis are known to react with organic acids up to the point of complete esterification with or without further resinification. The resinification taking place as the final step of the present invention, however, is not due to any esterification but is based on the novel fact that the hydroxy esters formed in the first step of my process are able to polymerize and/or condense into high molecular products. The first step of this process is directly comparable to the alcoholysis practiced with other polybasic alcohols, such as glycol, glycerol or those of a higher order. The second step of the process, however, takes a basically different course in the group of the pentaerythritols from the group of other polybasic alcohols. In fact, the results obtained from the use of pentaerythritols are surprising and directly contrary to what should be expected from experience with other polyhydric alcohols.

The resins produced by the methods of this invention are light colored, brilliantly clear, exceptionally hard, and completely oil-soluble materials, which lend themselves especially for surface coatings and printing inks, although they have many other utilities. Their high bodying speed makes them particularly suitable for the manufacture of varnishes based on slow bodying oils, such as linseed, soya, dehydrated castor, and other vegetable oils of drying and semi-drying character. The outstanding rate of co-polymerization with oils also makes these resins ideal for very pale varnishes. Due to the shortness of time required for cooking, no discoloration can take place in the varnish kettle.

By changing the quantities and the types of the components, special properties can be developed in the resins making them especially suitable for many uses; for instance, in the paper and plastics industry, in the production of floor coverings, and in the textile, canning, and rubber industries. A principal use of the new resins is in the industry of paints, varnishes and printing inks.

The purposes of the present invention are achieved by alcoholizing pentaerythritol rosin esters by means of pentaerythritol alcohols and resinifying the hydro esters obtained by the alcoholysis. Accordingly the process of this invention utilizes an amount of pentaerythritol or polypentaerythritols which is substantially higher than that required for complete esterification of the rosin acids. It has been found that the minimum amount of alcohol necessary for this process must exceed the stoichiometric equivalent of acid to the extent that at least two hydroxyl groups in the molecule of the polyhydric alcohol are left free.

Expressed in actual percentages of raw material used, at least 20 parts of the polybasic alcohol on 100 parts of rosin acid are required. This amount is substantially higher than the quantities used in the procedures heretofore followed, which were about the stoichiometric equivalents. Using 100 parts of a rosin of an acid value of 168, 11.0 parts of pentaerythritol are required to saturate completely its four hydroxyl groups, 13.7 parts of dipentaerythritol are necessary to satisfy in full its six hydroxyls, and 15.0 parts of tripentaerythritol are the stoichiometric equivalent for perfect saturation of its eight hydroxyl groups.

To fulfill the requirements of this invention, i. e., to leave at least two hydroxyl groups free in the molecule of the polyhydric alcohol, the following amounts of alcohol have to be used for 100 parts of rosin:

| | Parts |
|---|---|
| Pentaerythritol | 22.0 |
| Dipentaerythritol | 20.5 |
| Tripentaerythritol | 20.0 |

These numerical figures apply to theoretical equivalents and adjustments have to be made according to the acid value of the type of rosin acids used and according to the acetyl value of the pentaerythritols applied. As previously pointed out for the practical purpose of this invention, the minimum amount of polyhydric alcohol to be applied per 100 parts of rosin, should be 20 parts; the parts as given above being by weight.

If less than 20 parts, but more than the stoichiometric amount, is used, i. e., if only about one hydroxyl group in the molecule of the alcohol remains unsaturated, improved characteristics of the final resin can be noticed; the improvement, however, is not marked enough to be of technical significance.

The higher the relative amount of polybasic alcohol, the more pronounced are the improvements in melting point, viscosity, bodying time and drying characteristics. A remarkable feature, that should be noted, is that the oil-solubility of the resins is retained even when the maximum amount of the polybasic alcohol is employed.

The upper limit of the quantity of polybasic alcohol to be reacted with the rosin acids is the percentage at which all but one of the hydroxyl groups of the pentaerythritol, or its polymers of a higher order are left free. A stoichiometrical calculation shows that this upper limit is 44 parts of pentaerythritol, 82 parts of dipentaerythritol, and 120 parts of tripentaerythritol per 100 parts of gum rosin or the equivalent of other rosin acid containing materials. For production purposes, amounts within these two limits as given above, are used, depending upon the particular properties, required for the particular purposes in hand, for which the resins produced are to be employed.

For the purpose of resin manufacturers, a good grade of technical pentaerythritol is available. Among the polypentaerythritols, technical dipentaerythritol and tripentaerythritol are at hand. The latter, containing small amounts of higher than the trimolecular poly ether alcohol, is known in the trade as technical polypentaerythritol. Instead of only one grade of the pentaerythritols, mixtures of the various types may be used in carrying out the present invention.

The rosin acid required for the process of this invention, is available in various forms; for instance, in the form of commercial abietic acid, containing also isomeric acids; also in the form of the various grades of gum or wood rosin, of polymerized or hydrogenated rosin, or of other types of treated rosin, which have retained their acid character.

The type of rosin acid base applied in this process influences the properties of the final resin produced. Higher melting points, viscosities and polymerization speeds, as for instance, inherent in polyemized rosin, will show their effect in the end products. Or, to cite another case, the different characteristics of solubility of gum and wood rosin will manifest themselves in the respective finished resins.

In carrying out the present invention, a desirable method to be employed is to first melt the rosin acid, or the rosin acid carrying material, in a closed kettle equipped with an agitator. In the liquid state at about 200° C., the material is mixed with the pentaerythritol or the poly ether alcohols, or mixtures thereof. This mixture is heated up and agitated in four hours to 270° C., and held at this temperature for eight hours. Esterification proceeds quickly, without catalyst, due to the excess of the alcoholic component, and is immediately followed by alcoholysis and resinification of the thus formed hydroxy esters. The process of resin formation is completed by continuing the heating at about 270° C. for two hours under vacuum. This represents a very desirable method of carrying out the present invention but the conditions of operation may be modified to suit the particular resin production being carried out. The range of temperatures may be generally within those commonly employed for reactions of this character, as for example, from 200 to 300° C., more particularly between 250 and 300° C., lower temperatures requiring a longer period of time than higher temperatures. When carrying out the reaction near the lower limit of temperature, application of one of the catalysts suitable in esterification processes may be advisable. But the utilization of an esterification catalyst within the preferred method as set forth above is not necessary in carrying out this invention. The degree of vacuum may also be varied within the customary limits, and a stream of an inert gas may be introduced into the batch to prevent oxidation.

As previously described, alcoholysis usually follows esterification immediately, thereby combining both reactions into a one step procedure. For the purposes of producing resins for special end uses, it is sometimes useful to separate the two reactions, employing different types of pentaerythritols in each of the reactions; for instance, to esterify the rosin acid with the monomolecular alcohol first and then to alcoholize the rosin ester with the trimolecular alcohol. The hydroxy esters obtained in this way are finally converted by further heating into the new resin, which is a particular object of the present invention. The temperature conditions are the same for the two step process as for the one step procedure. The time to be allotted for the esterification alone may, for example, be ten hours at 270° C., to be followed by eight hours heating at 270° C. for polymerization and condensation. The quantities of pentaerythritols used for esterification only are the stoichiometrical ones; the further additions made for alcoholysis amount to quantities varying between 20% and the maximum amounts given in the specification.

The invention may be more readily understood by detailed explanation of actual process of manufacturing of the resins and a description of the characteristics. The following specific examples of actual resins prepared by resinification of hydroxy esters are given.

(1) A resin based on the 2-hydroxy ester of pentaerythritol is prepared in the way described above from 100 parts of N gum rosin and 22 parts of technical pentaerythritol. This resin has a melting point of 125° C. (ball and ring method), a viscosity of G (60% solid resin content in nitration xylol, measured on Gardner scale), and a bodying time of 40 minutes (1 part of resin copolymerized with 2 parts of Z body linseed oil at 300° C., until a viscosity of H is reached with a 50% solid solution in mineral spirits).

The data for the equivalent non-alcoholized resin, made from the same rosin and pentaerythritol in the stoichiometric ratio of 100 to 11, are as follows: melting point, 115° C., viscosity B, bodying time 70 minutes.

(2) A resin based on the 3-hydroxy ester of tripentaerythritol is prepared in the way described above from 100 parts of WG gum rosin and 25 parts of technical polypentaerythritol. This resin has a melting point of 135° C., a viscosity of R and a bodying time of 25 minutes. The corresponding data for an orthodox non-alcoholized resin, made from the same rosin, and the same polpentaerythritol in the stoichiometric ratio of 100 to 15, are as follows: melting point 130° C., viscosity H, bodying time 50 minutes.

A comparison of the property characteristics reported in the above two examples demonstrates clearly the superiority of the novel resins of this invention over the resins heretofore known. In both cases, only half, or less than half, of the available hydroxyl groups are left unsaturated before the resinification. When more than half of the hydroxyl groups are left free, the superiority of the end products over the orthodox resins becomes much more pronounced and really spectacular, as brought out by the following two examples:

(3) A resin based on the 3-hydroxy ester of pentaerythritol is prepared from 100 parts of WW gum rosin and 44 parts of technical pentaerythritol according to the methods described above. The constants of this resin are as follows:

Melting point: 145° C., compared to 115° C. of normal resin.
Viscosity in solution: V, compared to B of normal resin.
Bodying time: 10 min., compared to 70 minutes of normal resin.

(4) A resin based on the 6-hydroxy ester of tripentaerythritol is prepared from 100 parts of H gum rosin and 60 parts of technical polypentaerythritol according to the method described above. The constants of this resin are as follows:

Melting point: 165° C., compared to 130° C. of normal resin.
Viscosity in solution: $Z_6+$, compared to H of normal resin.
Bodying time: 0, min., compared to 50 minutes of normal resin.

The following examples will further clarify the invention:

(5) A floor varnish of exceptional drying and hardness is obtained by first preparing, in the manner described above, a resin by heating 100 parts of K gum rosin, 0.5 part of fumaric acid and 18 parts of dipentaerythritol. 100 parts of the resin obtained is then heated with 150 parts of dehydrated castor oil of a viscosity of Z, at 290° C. for 30 minutes, and after cooling thinned with 250 parts of mineral spirits. Driers are added in the amount of 0.1% cobalt and 1.0% lead figured on the oil content.

(6) A white enamel vehicle of unusual color and film characteristics is produced by co-polymerizing 200 parts of slightly pre-bodied soya bean oil with 100 parts of a polyhydric polymer prepared according to the process of this invention using in this instance two different alcohol types of the pentaerythritol group in the following manner. 100 parts of polymerized rosin are esterified with 10 parts of ordinary pentaerythritol; after the esterification is completed, 10 parts of technical polypentaerythritol are added and the reaction mixture is held at 270° C. for six hours, vacuum being applied for the last two hours. The resin obtained in this way has exceptionally high melting point and very pale color. Its bodying characteristics are so pronounced, that in this example of co-polymerization of 200 parts of soya oil with 100 parts of resin, only two hours at 295° C. are required to reach a viscosity of F with 50% solids.

(7) A gloss ink vehicle of outstanding gloss, tackfreeness and hardness is produced by means of a resin made from 100 parts of gum rosin and 25 parts of dipentaerythritol in the manner described above. 100 parts of this resin are heated with 100 parts of Z₂ bodied linseed oil up to 220° C. until a sample of the batch after cooling stays clear. Then 50 parts each of paraffin oil and kerosene are added and the customary amounts of wax, lead acetate and cobalt paste are stirred in.

Having thus set forth my invention, I claim:

1. The condensation and polymerization product formed at a temperature of 250–300° C. under vacuum of a hydroxy ester of rosin acid with a pentaerythritol group polyhydric alcohol as the sole essential reacting components, the hydroxy ester being the reaction product formed at a temperature of from 200–300° C. of rosin acid with a pentaerythritol group polyhydric alcohol as the sole essential reacting components, the amount of alcohol exceeding the stoichiometric equivalent of acid to the extent that at least two hydroxyl groups in the polyhydric alcohol are left free, but not exceeding the amount at which all but one of the hydroxyl groups are left free.

2. The product of claim 1 produced from rosin and pentaerythritol.

3. The product of claim 1 produced from rosin and dipentaerythritol.

4. The product of claim 1 produced from rosin and tripentaerythritol.

5. The product of claim 1 produced from rosin and pentaerythritol within the ratios of 22.0 to 44 parts by weight of the alcohol to 100 parts by weight of the rosin.

6. The product of claim 1 produced from rosin and dipentaerythritol in the ratios of from 20.5 to 82 parts by weight of the alcohol to 100 parts by weight of the rosin.

7. The product of claim 1 produced from rosin and tripentaerythritol in the ratios of from 20.0 to 120 parts by weight of the alcohol to 100 parts by weight of the rosin.

8. The condensation and polymerization product formed at a temperature of 250–300° C. under vacuum of a hydroxy ester of rosin acid with a pentaerythritol group polyhydric alcohol as the sole essential components, the hydroxy ester being the product formed at a temperature of from 200–300° C. of alcoholysis of a normal ester of rosin acid with a pentaerythritol group polyhydric alcohol in stoichiometric ratio, by means of a pentaerythritol group polyhydric alcohol different from that in the ester, the total amount of alcohol present in the product exceeding the stoichiometric equivalent of acid to the extent that at least two hydroxyl groups in the polyhydric alcohol are left free, but not exceeding the amount at which all but one of the hydroxyl groups are left free.

9. The product of claim 8 produced from rosin and pentaerythritol.

10. The product of claim 8 produced from rosin and dipentaerythritol.

11. The product of claim 8 produced from rosin and tripentaerythritol.

12. The method of producing a condensation and polymerization product which comprises heating together a pentaerythritol group polyhydric alcohol and a rosin acid as the sole essential reacting components, the amount of alcohol exceeding the stoichiometric equivalent of acid to the extent that at least two hydroxyl groups in the polyhydric alcohol are left free, but not exceeding the amount at which all but one of the hydroxyl groups are left free, at a temperature of from 200–300° C., until a hydroxy ester is produced, and heating the hydroxy ester as the sole essential condensing and polymerizing material at a temperature of from 250–300° C. under vacuum, until the melting point of the resinous product remains constant on further heating, indicating completion of the reaction.

13. The method as set forth in claim 12, in which the reacting components are rosin and pentaerythritol in the ratios of from 22.0 to 44 parts by weight of the alcohol to 100 parts by weight of the rosin.

14. The method as set forth in claim 12, in which the reacting components are rosin and diphentaerythritol in the ratios of from 20.5 to 82 parts by weight of the alcohol to 100 parts by weight of the rosin.

15. The method as set forth in claim 12, in which the reacting components are rosin and tripentaerythritol in the ratios of from 20.0 to 120 parts by weight of the alcohol to 100 parts by weight of the rosin.

16. The method of producing a condensation and polymerization product of a hydroxy ester of rosin acid with a pentaerythritol group polyhydric alcohol as the sole essential reacting components, the amount of alcohol exceeding the stoichiometric equivalent of acid to the extent that at least two hydroxyl groups in the polyhydric alcohol are left free, but not exceeding the amount at which all but one of the hydroxyl groups are left free by heating the hydroxy ester as the sole essential condensing and polymerizing material at a temperature of from 250–300° C. under vacuum, until the melting point of the resinous product remains constant on further heating, indicating completion of the reaction.

17. The method of producing a condensation and polymerization product of a hydroxy ester of rosin acid with a pentaerythritol group polyhydric alcohol as the sole essential components, the hydroxy ester being the product of alcoholysis of a normal ester of rosin acid with a pentaerythritol group polyhdric alcohol in stoichiometric ratio, by means of a pentaerythritol group polyhydric alcohol, the total amount of alcohol present in the product exceeding the stoichiometric equivalent of acid to the extent that at least two hydroxyl groups in the polyhydric alcohol are left free, but not exceeding the amount at which all but one of the hydroxyl groups are left free, and by heating the hydroxy ester thus obtained at a temperature of from 250–300° C. under vacuum until the melting point of the resinous product remains constant on further heating, indicating completion of the reaction.

WILLIAM KRUMBHAAR.

REFERENCES CITED

The following references are of record in the file of this patent:

UNITED STATES PATENTS

| Number | Name | Date |
|---|---|---|
| 2,241,341 | Ender | May 6, 1941 |
| 2,324,432 | Schantz | July 13, 1943 |
| 2,340,043 | Clare | Jan. 25, 1944 |
| 2,346,409 | Anderson | Apr. 11, 1944 |
| 2,362,882 | Carson, Jr. | Nov. 14, 1944 |

OTHER REFERENCES

Woodruff, "American Ink Maker," May 1944, pages 25 to 28.

Oswald, "American Ink Maker," Mar. 1945, pages 25 to 47.